(12) United States Patent
Leonardi et al.

(10) Patent No.: US 11,557,947 B2
(45) Date of Patent: Jan. 17, 2023

(54) STATORS AND ROTORS WITH VARYING INSULATIVE DENSITY

(71) Applicant: Ford Global Technologies, LLC, Dearborn, MI (US)

(72) Inventors: Franco Leonardi, Dearborn Heights, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 547 days.

(21) Appl. No.: 16/598,698

(22) Filed: Oct. 10, 2019

(65) Prior Publication Data

US 2021/0111613 A1    Apr. 15, 2021

(51) Int. Cl.
| | | |
|---|---|---|
| *H02K 15/12* | (2006.01) | |
| *H02K 3/28* | (2006.01) | |
| *H02K 15/02* | (2006.01) | |
| *H02K 1/18* | (2006.01) | |
| *B33Y 80/00* | (2015.01) | |
| *B33Y 10/00* | (2015.01) | |

(52) U.S. Cl.
CPC .............. *H02K 15/12* (2013.01); *H02K 1/185* (2013.01); *H02K 3/28* (2013.01); *H02K 15/024* (2013.01); *B33Y 10/00* (2014.12); *B33Y 80/00* (2014.12)

(58) Field of Classification Search
CPC .............................. H02K 3/26; H02K 15/0407
USPC ...... 310/216.017, 216.018, 216.059, 216.107
See application file for complete search history.

(56) References Cited

U.S. PATENT DOCUMENTS

| 8,456,057 | B2 | 6/2013 | Hasuo et al. |
| 9,419,502 | B2 | 8/2016 | Veronesi et al. |
| 2018/0205285 | A1 | 7/2018 | Huang et al. |
| 2018/0205299 | A1* | 7/2018 | Huang ................ H02K 5/04 |
| 2018/0233997 | A1* | 8/2018 | Takahashi ........... H02K 1/02 |

FOREIGN PATENT DOCUMENTS

WO    WO-2020247326 A1 * 12/2020    ............ H02K 1/148

* cited by examiner

*Primary Examiner* — Quyen P Leung
*Assistant Examiner* — Minki Chang
(74) *Attorney, Agent, or Firm* — David B. Kelley; Brooks Kushman P.C.

(57) ABSTRACT

An electric machine includes a plurality of printed layers arranged to form a stator having an outer periphery and teeth extending radially inward from the outer periphery. Each of the printed layers includes discrete portions of metal and discrete portions of insulation. The discrete portions of insulation define a contiguous network of insulative boundaries separating discrete cells formed by the discrete portions of the metal. A volume of the discrete cells within the outer periphery is greater than a volume of the discrete cells within the teeth such that a reluctance of the teeth is greater than a reluctance of the outer periphery.

14 Claims, 7 Drawing Sheets

STATORS AND ROTORS WITH VARYING INSULATIVE DENSITY

TECHNICAL FIELD

This disclosure relates to the construction of electric machine components.

BACKGROUND

An automotive vehicle may include a battery to power an electric machine that is arranged to propel wheels of the vehicle. Control of the battery, including charge, discharge, and cell balance operations, may depend on voltages of cells of the battery.

The electric machine may include a stator and rotor. The stator is typically stationary. Energy flows through the stator to or from the rotor. In an electric motor, the stator provides a rotating magnetic field that drives the rotating armature. In a generator, the stator converts the rotating magnetic field to electric current.

The rotor is the moving component. Its rotation is due to the interaction between the windings and magnetic fields, which produces a torque around the rotor's axis.

SUMMARY

An electric machine includes a plurality of printed layers arranged to form a stator having an outer periphery and teeth extending radially inward from the outer periphery. Each of the printed layers includes discrete portions of metal and discrete portions of insulation. The discrete portions of insulation define a contiguous network of insulative boundaries separating discrete cells formed by the discrete portions of the metal. A volume of the discrete cells within the outer periphery is greater than a volume of the discrete cells within the teeth such that a reluctance of the teeth is greater than a reluctance of the outer periphery. The electric machine also includes a rotor disposed within the stator adjacent to the teeth.

An electric machine includes a plurality of printed layers arranged to form a rotor having an outer periphery and an inner periphery. Each of the printed layers includes discrete portions of metal and discrete portions of insulation. The discrete portions of insulation define a contiguous network of insulative boundaries separating discrete cells formed by the discrete portions of the metal. A volume of the discrete cells within the outer periphery is less than a volume of the discrete cells within the inner periphery such that a reluctance of the outer periphery is greater than a reluctance of the inner periphery. The electric machine also includes a stator having a periphery and teeth, extending radially inward from the periphery, that surround the rotor.

An electric machine includes a plurality of printed layers arranged to form a stator and a rotor disposed within the stator. Some of the plurality of printed layers includes discrete portions of metal and discrete portions of insulation and other of the plurality of printed layers includes discrete portions of the metal only such that at least one of the stator or rotor defines fins.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machine efficiency requirements often demand that core material (electrical steel) be segmented to reduce eddy current loss during operation. A common approach is to create stator and rotor cores with thin laminations. Another approach is to use steel flakes or steel powder that has been pressed together after treating the raw material to increase its surface resistance. Laminated cores are made of thin laminations stamped from steel sheets of uniform and consistent thickness. The thickness is chosen as a compromise between cost, losses, and stacking factor. Thinner laminations result in more expensive cores, with lower losses, but also slightly lower torque capability because the insulation between the sheets takes proportionally more space with thinner laminations.

Here, additive manufacturing enables arrangements different than those suggested above. In particular, the ability to print electrical steel and insulating material alternately during core manufacture is leveraged. The insulating layers may be deposed more densely toward the inner surface of the core where the loss density is normally higher-simulating thin laminations. The insulation layers spacing is coarser toward the back, achieving a higher density of the flux carrying material (steel) resulting in higher torque capability. This is equivalent to an improved stacking factor for conventional laminated cores. When very fine laminations are used, 5 to 10% of the volume is occupied by the insulation between the lamination. By limiting the fine segmentation to the small area of high loss, the overall reluctance of the core is reduced leading to improved performance.

Insulation layers may also be deposed in a honeycomb pattern or other polyhedral pattern, denser in areas of higher loss concentration and larger in other areas. The size of the honeycomb cell (or other equivalent structure) can be varied throughout to optimize the ratio of loss and amount of active material (steel). As described above, the amount of insulating material should be kept to a minimum to avoid higher reluctance (lower permeability) of the core, which limits magnetic flux penetration. In some areas of a rotor, the requirement to reduce losses may interfere with the strength requirements of the material. One example could be the thin portions between the magnet pockets and the outer edge of the rotor (bridges). The segmentation can be suspended in the bridge area to maintain a high yield stress and a high speed rating.

Figure 1:
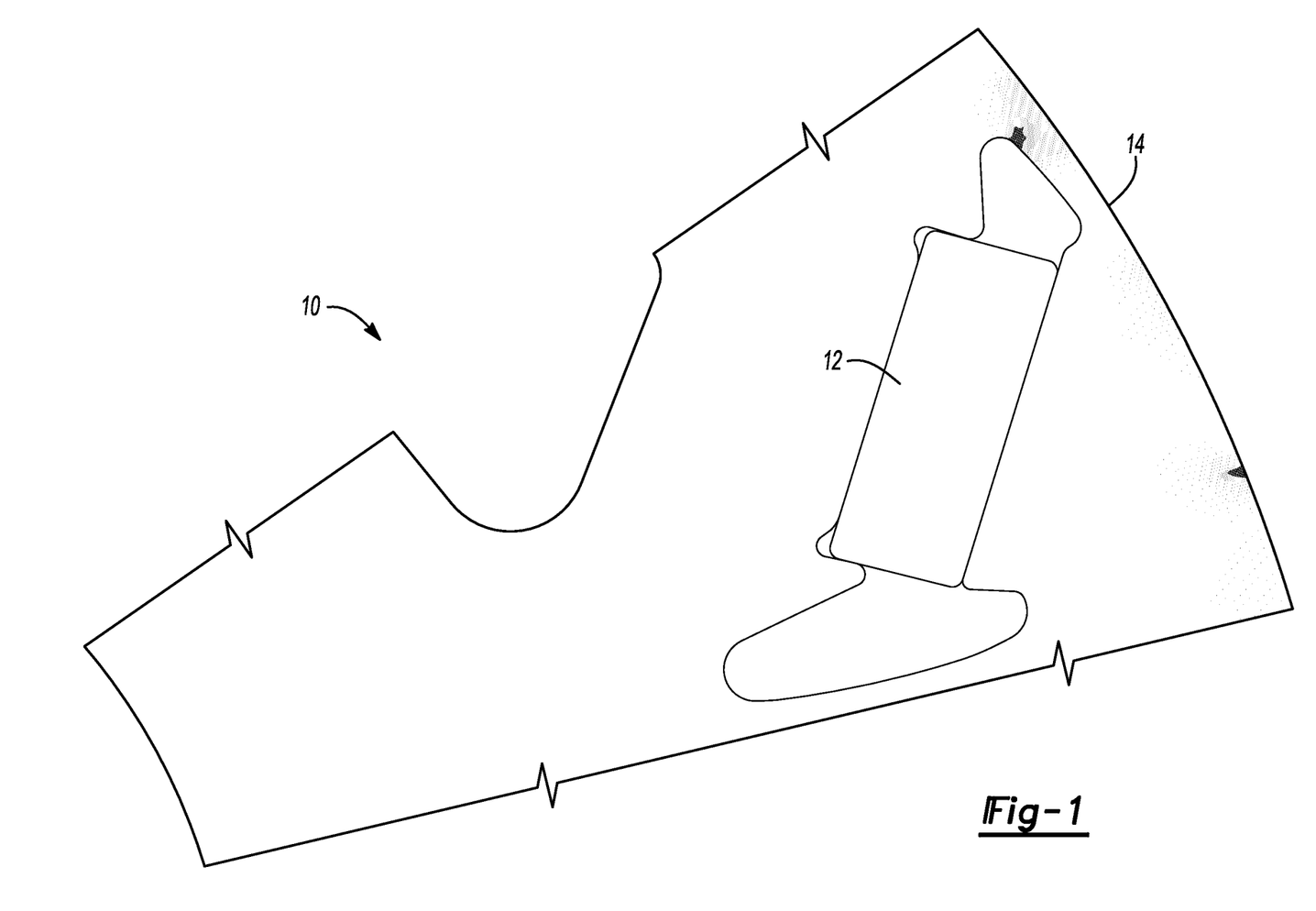
FIG. 1 is plan view of a part of a conventional rotor showing areas of differing core loss.

In more detail, a rotor and/or stator of an electric machine may have non-uniform core loss distribution. With reference to FIG. 1 for example, simulation of a portion of a rotor 10 containing permanent magnets 12 therein reveals regions of higher loss concentrations (textured) around outer periphery 14 near the airgap region between the rotor 10 and stator (not shown). These higher loss regions can undesirably affect performance of the electric machine. Depending on electric machine design, these areas may be larger or smaller, and be located in different or other regions.

Figure 2A:
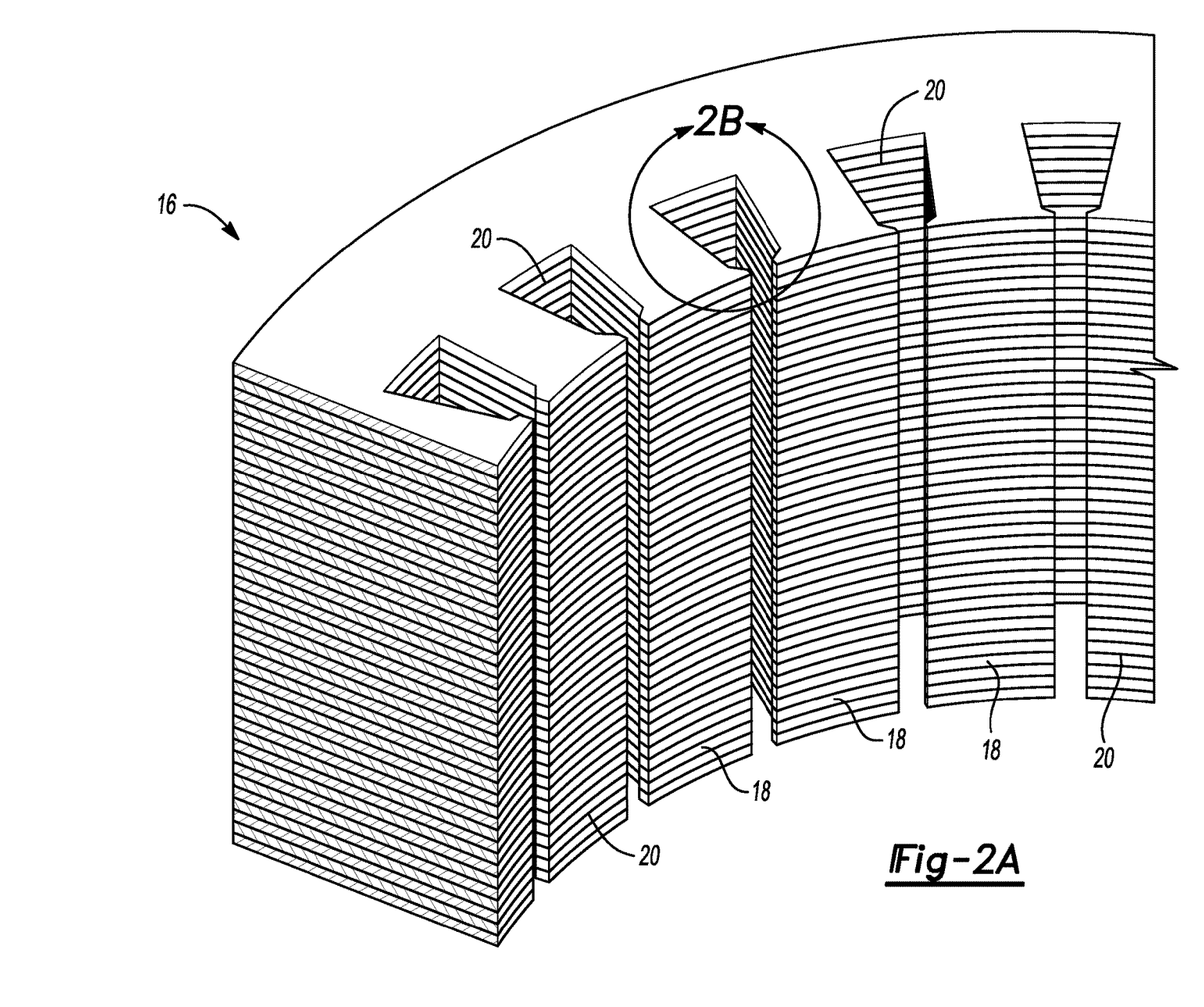
FIG. 2A is a perspective view of a part of a conventional stator.
Figure 2B:
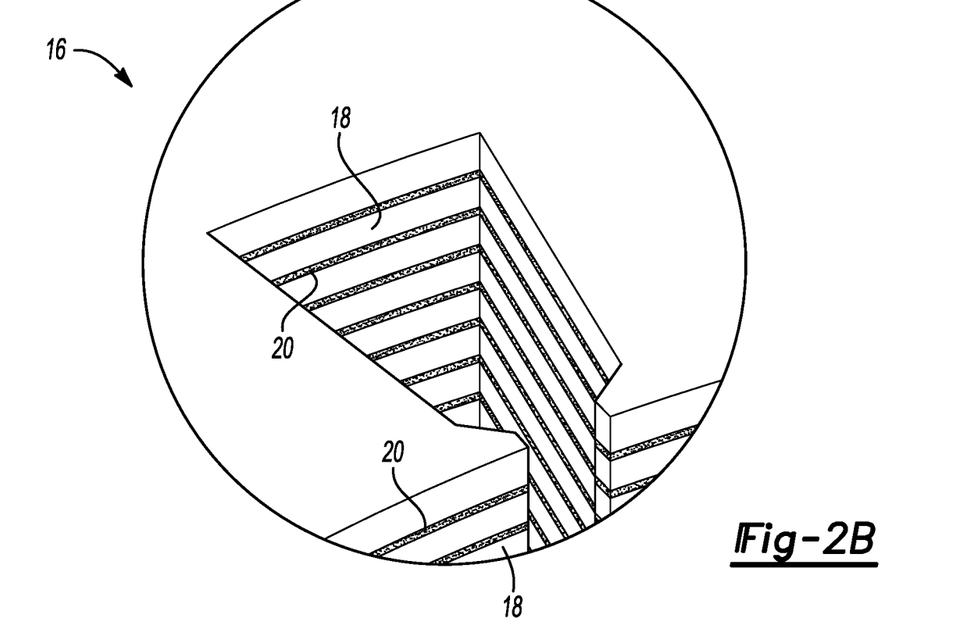
FIG. 2B is an enlarged view of a portion of the stator of FIG. 2A

With reference to FIGS. 2A and 2B, a stator 16 (and rotor) is typically constructed from a series of thin laminations 18 stamped from steel sheets of uniform consistent thickness. The thickness can be chosen as a compromise between cost, losses, and stacking factor. Thinner laminations result in more expensive cores, with lower losses, but also slightly lower torque capability because insulation 20 between each of the sheets 18 takes proportionally more space with thinner laminations. The requirement of reducing losses on the inner surface of the core (especially in rotors) conventionally determines how thin the laminations 18 should be.

Some traditional manufacturing techniques involve a material being carved or shaped into the desired product by parts of it being removed. Laminations of a rotor or stator, for example, can be stamped from sheets of metal as mentioned above. Additive manufacturing, in some sense, is the opposite. Structures are made by the addition of a number of layers that combine to create the product. The process may involve the use of a computer and special software that can relay messages to the printer so that it "prints" the desired shape.

Suitable for use with a range of different materials, a cartridge is loaded with the relevant substance, and this is "printed" into the shape, one wafer-thin layer at a time. These layers are repeatedly printed on top of each other, being fused together during the process until the shape is complete.

Here, the ability to selectively depose (print) discrete portions of electrical steel and insulating material, during stator or rotor manufacture allows the creation of components tailored to perform within their unique environment. Using additive manufacturing techniques, the insulating layers can be printed more densely within those areas of the rotor or stator where the loss density is normally higher, simulating locally thin laminations. The insulative-layer spacing can be coarser elsewhere, achieving a higher density of the flux carrying material (steel) resulting in higher torque capability. This is equivalent to an improved stacking factor for conventional components. When very fine laminations are used, 5 to 10% of the volume is occupied by the insulation between the laminations. By limiting the fine segmentation to the localized areas of high loss, the reluctance of the rotor or stator is reduced leading to improved performance.

Figure 3A:
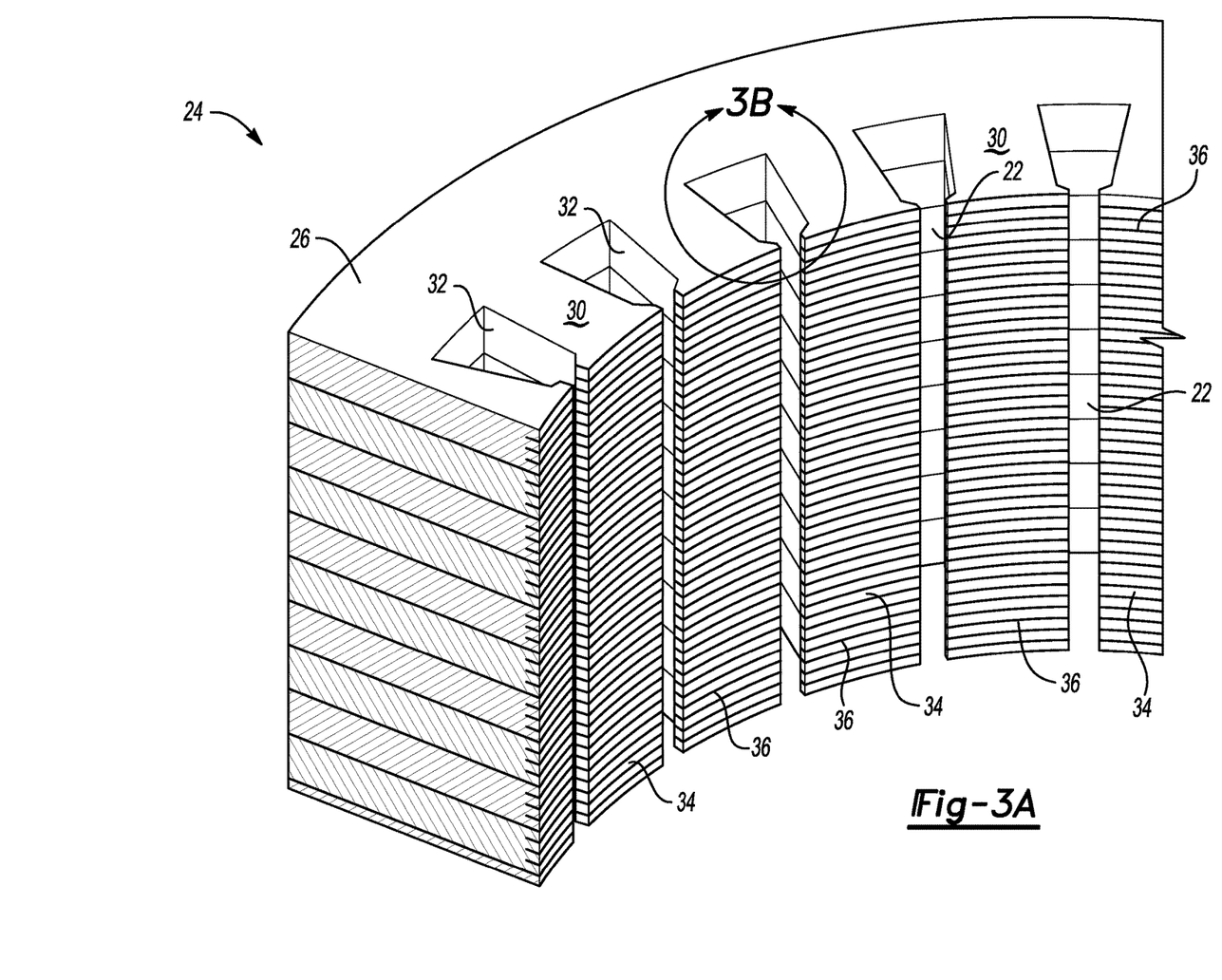
FIG. 3A is a perspective view of a part of a stator having more insulative material in certain regions as compared with others.
Figure 3B:
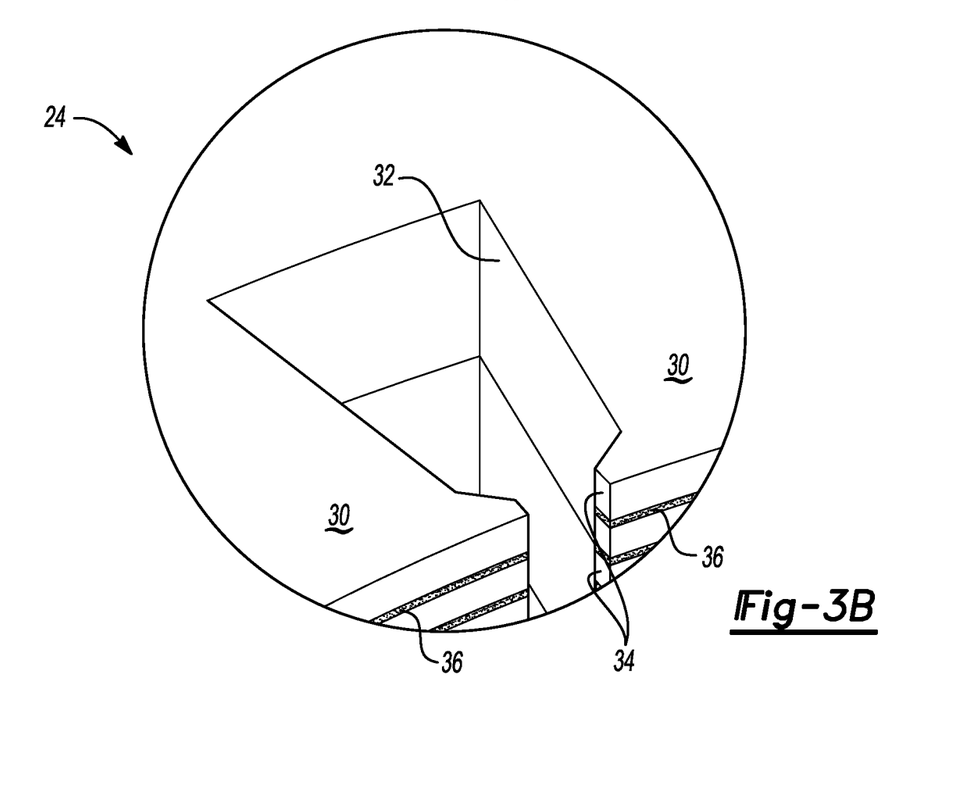
FIG. 3B is an enlarged view of a portion of the stator of FIG. 3A.

With reference to FIGS. 3A and 3B, a plurality of rings 22 are stacked to form a stator 24. The stator 24 has an outer periphery 26 and a plurality of teeth 28 extending radially inward from the outer periphery 26. Tooth portions 30 of each of the rings 22 each include a base 32 and a plurality of fins 34 (e.g., 5 fins) extending radially inward from the base 32. Insulative material 36 is disposed between the fins 34 (and the rings 22). So arranged, the portions of the stator 24 collectively defined by the fins 34 have more insulative material on a per unit volume basis as compared with the bases 32 and outer periphery 26. Thus, the insulative-layer spacing is coarser in the bases 32 and outer periphery 26 as compared with the portions of the stator 24 collectively defined by the fins 34, which reduces the tendency of the stator 24 to experience higher core loss in the localized areas adjacent the rotor (rotor not shown) as the reluctance is relatively greater in these localized areas without unnecessarily impacting the overall performance of the stator 24.

Figure 4:
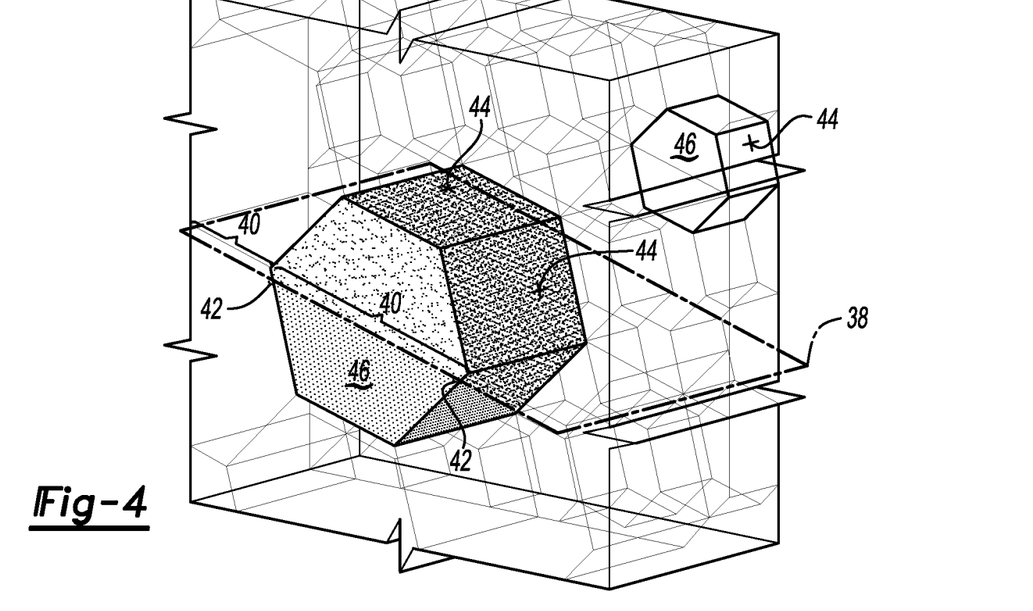
FIGS. 4 and 5 are parts of core material (for a rotor or stator) with different cell arrangements.

With reference to FIG. 4, printed layers 38 have discrete portions of electric steel 40 and discrete portions of insulative material 42 arranged to form a contiguous network of insulative boundaries 44 that separate discrete cells 46 of the electric steel deposed in a honeycomb pattern of hexagonal cylinders. The pattern can be more dense (smaller discrete cells) in areas of otherwise higher potential loss concentration to increase localized reluctance (shown for example in a rotor and stator in FIG. 6) and less dense (larger discrete cells) in other areas to reduce localized reluctance such that, for example, the volume of the discrete cells within the outer periphery of the stator 24 is greater than a volume of the discrete cells within the teeth. The size of the honeycomb cells 46, or other geometric cells such as octagonal, cylindrical, or polyhedron (e.g., cuboid) cells, or non-geometric cells, can be varied throughout the structure to optimize the ratio of loss and amount of active material (steel). As described above, the overall amount of insulating material 42 should be kept to a minimum to avoid overall higher reluctance (lower permeability) of the core which limits magnetic flux penetration.

Figure 5:
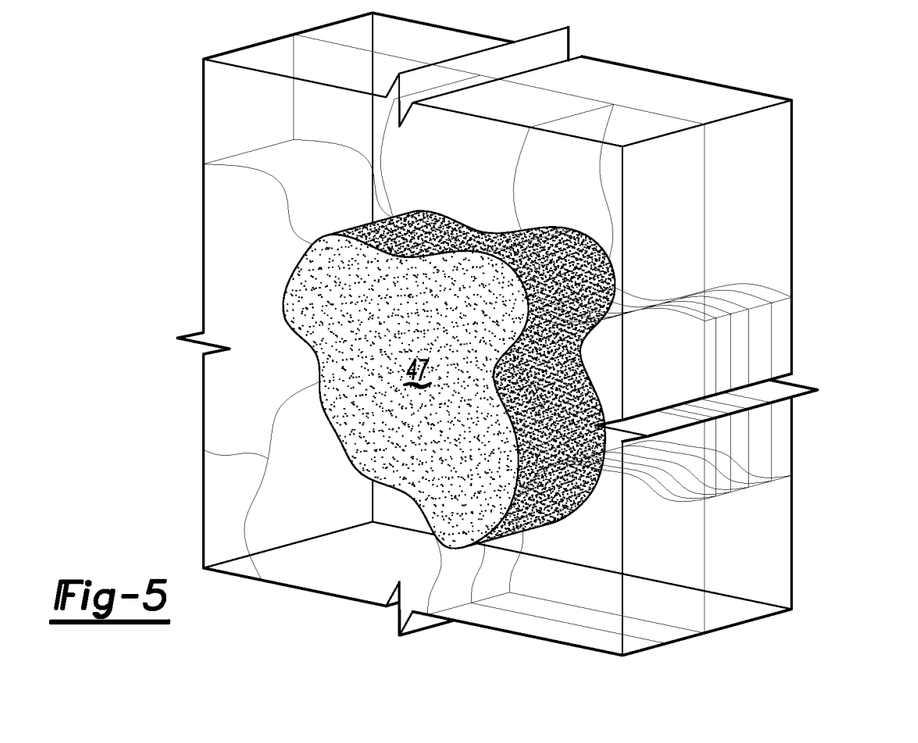

With reference to FIG. 5, discrete cells 47 may instead have different and/or irregular shapes.

Figure 6:
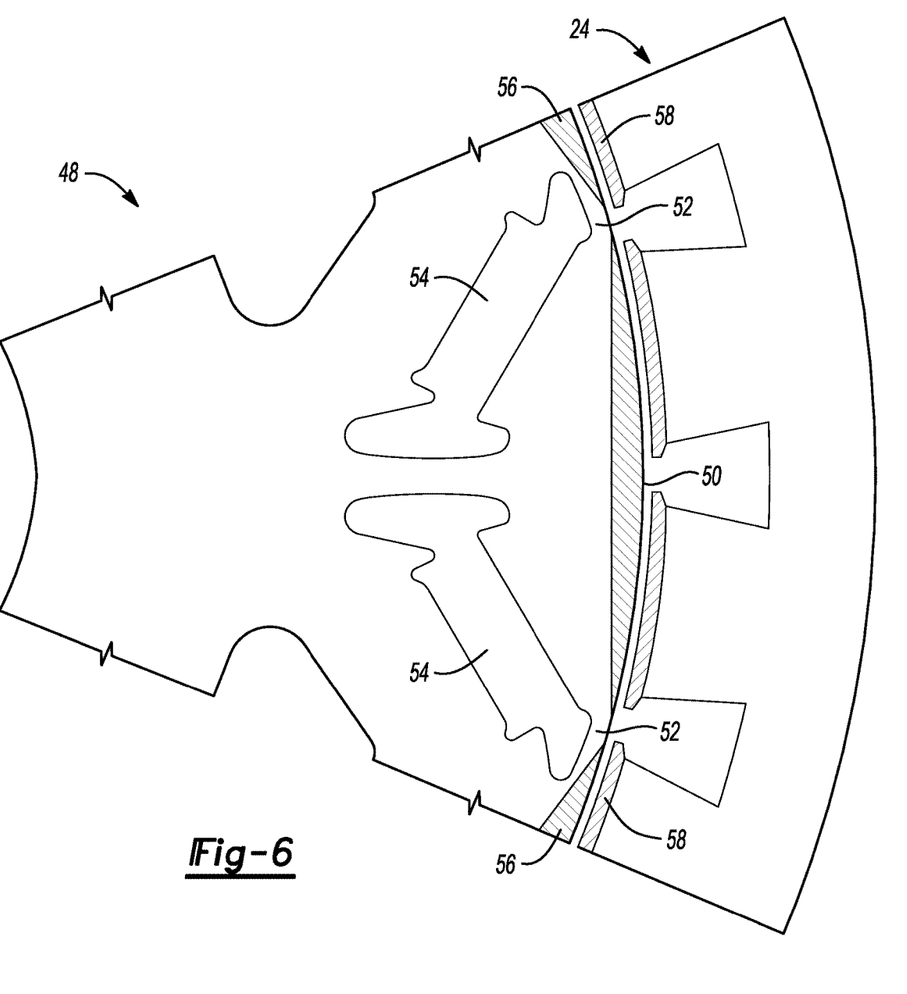
FIG. 6 is a plan view of a part of a rotor and stator showing regions with more insulative material in certain regions as compared with others.

With reference to FIG. 6, a rotor 48 could have a requirement to reduce core losses around its outer periphery 50 while at the same time achieving certain strength requirements in portions 52 between magnet pockets 54 and the outer periphery 50. In this case, the rotor 48 and stator 24 respectively have areas of finer segmentation 56, 58 as discussed above. The areas of finer segmentation 56 can be suspended in the bridge areas 52 to maintain a high yield stress and a high speed rating.

Figure 7:
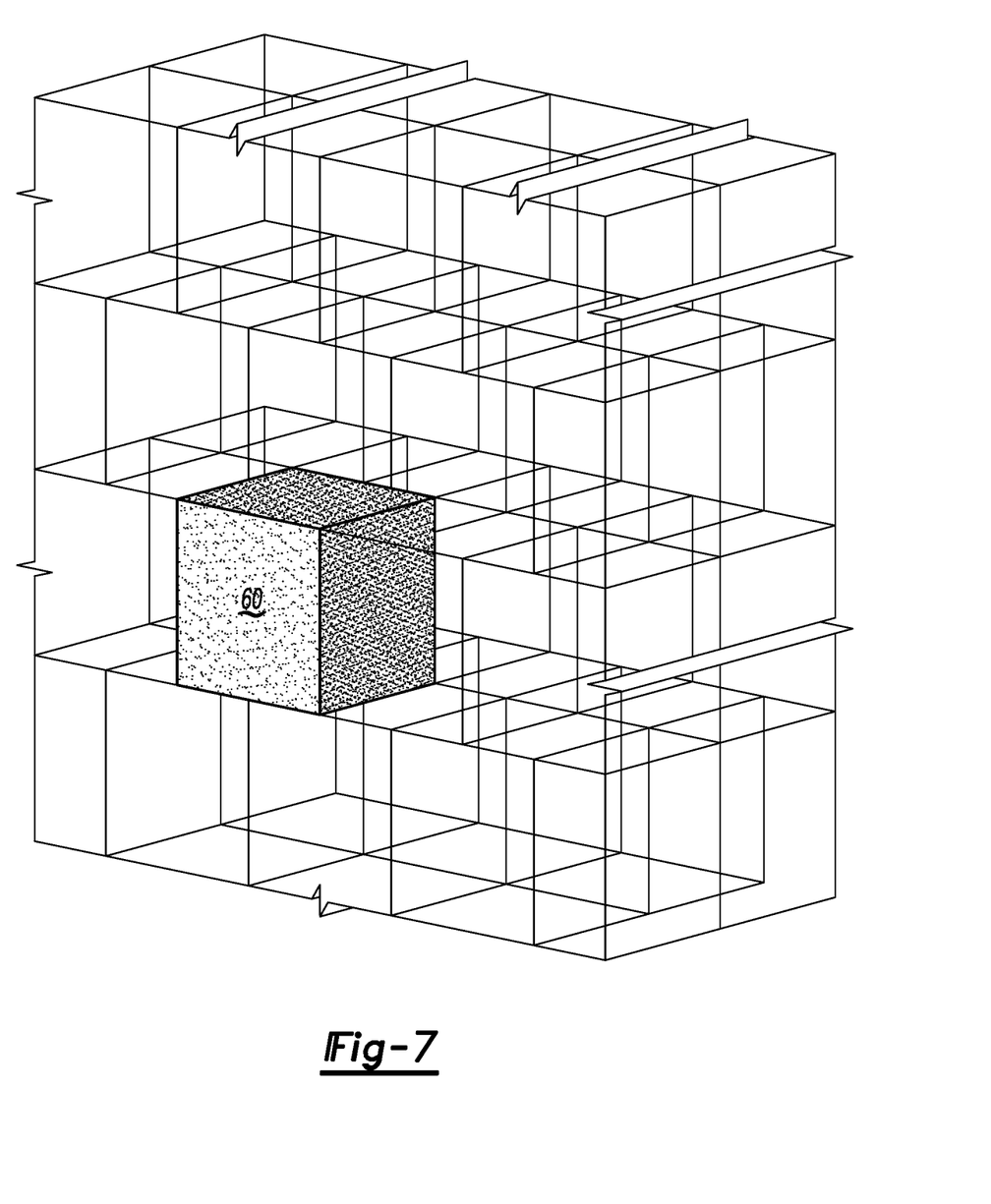
FIG. 7 is part of core material (for a rotor or stator) with a cuboid cell arrangement.

With reference to FIG. 7, discrete cells 60 may have cuboid shapes.

Additive manufacturing systems, as suggested above, can be used to create the components contemplated herein. The corresponding processes, methods, or algorithms to create these components can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
   a plurality of printed layers arranged to form a stator having an outer periphery and teeth extending radially inward from the outer periphery, wherein each of the printed layers includes discrete portions of metal and discrete portions of insulation, wherein the discrete portions of insulation define a contiguous network of insulative boundaries separating discrete cells formed by the discrete portions of the metal, wherein a volume of the discrete cells within the outer periphery is greater than a volume of the discrete cells within the teeth such that a reluctance of the teeth is greater than a reluctance of the outer periphery; and
   a rotor disposed within the stator adjacent to the teeth.

2. The electric machine of claim 1, wherein the contiguous network of insulative boundaries defines a honeycomb pattern.

3. The electric machine of claim 1, wherein the discrete cells have different shape.

4. The electric machine of claim 1, wherein the discrete cells are polyhedrons.

5. The electric machine of claim 4, wherein the discrete polyhedrons are cuboids.

6. The electric machine of claim 1, wherein the discrete cells are hexagonal cylinders.

7. The electric machine of claim 1, wherein the discrete cells have irregular shape.

8. An electric machine comprising:
   a plurality of printed layers arranged to form a rotor having an outer periphery and an inner periphery, wherein each of the printed layers includes discrete portions of metal and discrete portions of insulation, wherein the discrete portions of insulation define a contiguous network of insulative boundaries separating discrete cells formed by the discrete portions of the metal, and wherein a volume of the discrete cells within the outer periphery is less than a volume of the discrete cells within the inner periphery such that a reluctance of the outer periphery is greater than a reluctance of the inner periphery; and
   a stator having a periphery and teeth, extending radially inward from the periphery, that surround the rotor.

9. The electric machine of claim 8, wherein the contiguous network of insulative boundaries defines a honeycomb pattern.

10. The electric machine of claim 8, wherein the discrete cells have different shape.

11. The electric machine of claim 8, wherein the discrete cells are polyhedrons.

12. The electric machine of claim 11, wherein the discrete polyhedrons are cuboids.

13. The electric machine of claim 8, wherein the discrete cells are hexagonal cylinders.

14. The electric machine of claim 8, wherein the discrete cells have irregular shape.

* * * * *